(12) United States Patent
Yamada

(10) Patent No.: US 10,688,849 B2
(45) Date of Patent: Jun. 23, 2020

(54) AUTOMOBILE WINDOW GLASS

(71) Applicant: AGC INC., Chiyoda-ku (JP)

(72) Inventor: Daisuke Yamada, Tokyo (JP)

(73) Assignee: AGC INC., Chiyoda-ku (JP)

( * ) Notice: Subject to any disclaimer, the term of this patent is extended or adjusted under 35 U.S.C. 154(b) by 12 days.

(21) Appl. No.: 16/163,735

(22) Filed: Oct. 18, 2018

(65) Prior Publication Data
US 2019/0047378 A1 Feb. 14, 2019

Related U.S. Application Data

(63) Continuation of application No. PCT/JP2017/015347, filed on Apr. 14, 2017.

(30) Foreign Application Priority Data

Apr. 19, 2016 (JP) .................. 2016-083786

(51) Int. Cl.
| | | |
|---|---|---|
| B32B 3/02 | (2006.01) |
| B60J 1/00 | (2006.01) |
| C03C 17/32 | (2006.01) |
| C03C 17/22 | (2006.01) |
| B60S 1/02 | (2006.01) |
| B32B 17/10 | (2006.01) |
| B32B 18/00 | (2006.01) |

(52) U.S. Cl.
CPC .................. *B60J 1/002* (2013.01); *B60J 1/00* (2013.01); *B60S 1/02* (2013.01); *C03C 17/22* (2013.01);
(Continued)

(58) Field of Classification Search
CPC ...... B06J 1/00; B06J 1/002; B06J 1/02; B32B 17/10036; B32B 17/10174;
(Continued)

(56) References Cited

U.S. PATENT DOCUMENTS

2009/0239017 A1* 9/2009 Ishioka ............. B32B 17/10036
428/38
2009/0239543 A1 9/2009 Kozu
(Continued)

FOREIGN PATENT DOCUMENTS

JP 2006-264458 10/2006
JP 2012-206592 10/2012
(Continued)

OTHER PUBLICATIONS

International Search Report dated Jun. 20, 2017 in PCT/JP2017/015347 filed Apr. 14, 2017 (with English Translation).
(Continued)

Primary Examiner — Elizabeth E Mulvaney
(74) Attorney, Agent, or Firm — Oblon, McClelland, Maier & Neustadt, L.L.P.

(57) ABSTRACT

An automobile window glass includes a glass substrate, a black ceramic layer and a water absorbing antifogging film. The black ceramic layer is formed in a peripheral portion on a vehicle-interior side main surface of the glass substrate. The water absorbing antifogging film is formed on the vehicle-interior side main surface of the glass substrate and is located in an inner peripheral side relative to the peripheral portion. A space of more than 1 mm and less than 30 mm exists between the black ceramic layer and the water absorbing antifogging film on the vehicle-interior side main surface of the glass substrate.

19 Claims, 1 Drawing Sheet

(52) U.S. Cl.
CPC .......... *C03C 17/32* (2013.01); *B32B 17/1055* (2013.01); *B32B 17/10339* (2013.01); *B32B 18/00* (2013.01); *B32B 2307/726* (2013.01); *B32B 2315/02* (2013.01); *B32B 2315/08* (2013.01); *B32B 2605/006* (2013.01)

(58) Field of Classification Search
CPC ... B32B 17/10339; B32B 18/00; C03C 17/22; C03C 17/32
See application file for complete search history.

(56) References Cited

U.S. PATENT DOCUMENTS

| | | |
|---|---|---|
| 2015/0002284 A1 | 1/2015 | Matsuno et al. |
| 2017/0157897 A1 | 6/2017 | Kimura et al. |

FOREIGN PATENT DOCUMENTS

| | | |
|---|---|---|
| JP | 2014-001106 | 1/2014 |
| JP | 2015-011615 | 1/2015 |
| WO | WO 2007/052720 A1 | 5/2007 |
| WO | WO 2008/069186 A1 | 6/2008 |
| WO | WO 2016/035527 A1 | 3/2016 |

OTHER PUBLICATIONS

Written Opinion dated Jun. 20, 2017 in PCT/JP2017/015347 filed Apr. 14, 2017.

* cited by examiner

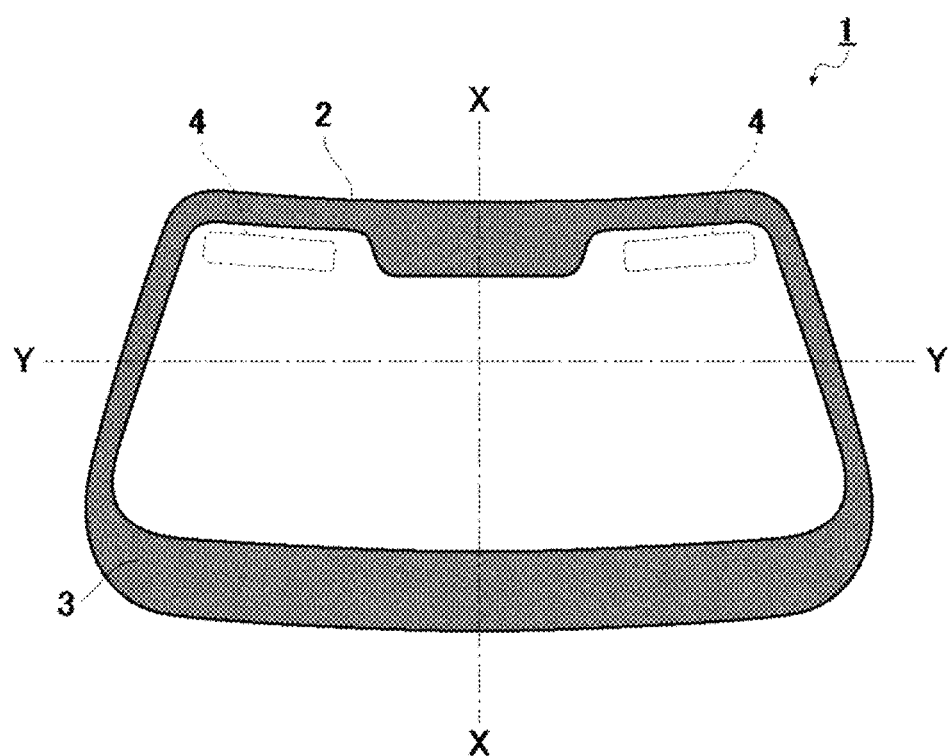

AUTOMOBILE WINDOW GLASS

TECHNICAL FIELD

The present invention relates to an automobile window glass, and more particularly to an automobile window glass which contributes to improvements in accuracy of a driving support system and automatic driving system using image information from a camera installed in a vehicle.

BACKGROUND ART

In recent years, various automobile driving support systems, which detect a front travel path shape or a three-dimensional object such as a vehicle or an obstacle existing ahead, by using a camera installed in a vehicle, enable steady travel on a travel path, and prevent a collision with the three-dimensional object, have been developed and put into practical use. In addition, an automatic driving system of an automobile which applied the driving support systems has been studied (Patent Documents 1 and 2, and the like).

Since the accuracy of the driving support system and the automatic driving system depends on image information from the camera installed in the vehicle, it is necessary to accurately reflect the image information in front of the automobile, such as the front travel path shape or the three-dimensional object existing ahead, in the camera installed in the vehicle.

However, since the image information from the camera installed in the vehicle is used, when fogging on an automobile windshield occurs, there is a concern that the accuracy of the driving support system and automatic driving system may decrease.

Here, an antifogging article including a water absorbing crosslinked resin layer has been proposed as a countermeasure against the above problem (Patent Document 3 and the like). It is expected that the antifogging article is used as an antifogging glass article on the automobile windshield. In the automobile windshield, a light shielding region (black ceramic layer) is often arranged in a peripheral portion.

A vehicle window antifogging glass and antifogging glass article of Patent Documents 4 and 5 are based on the premise that a water absorbing antifogging film is formed on substantially the whole of the windshield excluding the end portion in order to form the water absorbing antifogging film for the purpose of improving visibility of a driver.

However, when a laminated region in which the black ceramic layer and the water absorbing antifogging film overlap each other is provided, in consideration of a long-term use or a use under a severe environment, there is a concern that absorption of infrared rays contained in sunlight in the black ceramic layer may affect the water absorbing antifogging film. That is, due to the infrared ray absorption in the black ceramic layer, the temperature of the portion of the windshield where the black ceramic layer has been formed increases, and the temperature of the water absorbing antifogging film overlapping with the black ceramic layer also increases. As a result, there is a concern that the water absorbing antifogging film may be peeled off.

PRIOR ART DOCUMENT

Patent Document

Patent Document 1: JP 2012-206592 A
Patent Document 2: JP 2015-11615 A
Patent Document 3: WO 2007/052720 A1
Patent Document 4: WO 2008/069186 A1
Patent Document 5: JP 2014-1106 A

SUMMARY OF THE INVENTION

Technical Problems

In order to solve the above problems, an object of the present invention is to provide an automobile window glass which contributes to improvements in accuracy of a driving support system and automatic driving system using image information from a camera installed in a vehicle.

Solution to Problems

In order to achieve the above object, the present invention provides an automobile window glass including: a glass substrate; a black ceramic layer formed in a peripheral portion on a vehicle-interior side main surface of the glass substrate; and a water absorbing antifogging film formed on the vehicle-interior side main surface of the glass substrate, the water absorbing antifogging film being located in an inner peripheral side relative to the peripheral portion, wherein a space of more than 1 mm and less than 30 mm exists between the black ceramic layer and the water absorbing antifogging film on the vehicle-interior side main surface of the glass substrate.

In the automobile window glass of the present invention, it is preferable that the glass substrate includes a laminated glass including a vehicle-interior side glass plate, a vehicle-exterior side glass plate, and an intermediate film disposed between these glass plates, and the black ceramic layer and the water absorbing antifogging film are formed on a vehicle-interior side main surface of the vehicle-interior side glass plate.

In the automobile window glass of the present invention, it is preferable that a space of 3 mm or more and 20 mm or less exists between the black ceramic layer and the water absorbing antifogging film.

In the automobile window glass of the present invention, the water absorbing antifogging film has a thickness of preferably 1 μm or more and 50 μm or less.

In the automobile window glass of the present invention, it is preferable that the water absorbing antifogging film includes a base layer on the glass substrate side.

Advantageous Effects of the Invention

By using the automobile window glass of the present invention as an automobile windshield, and setting a visual field of the camera installed in the vehicle so as to be included in a portion where the water absorbing antifogging film has been formed, it is possible to prevent a decrease in accuracy of the driving support system and automatic driving system using image information from the camera due to an occurrence of fogging on the windshield. As a result, the accuracy of the driving support system and automatic driving system is improved.

BRIEF DESCRIPTION OF DRAWINGS

FIG. 1 is a front view of an automobile window glass as an example of embodiments of the present invention.

DESCRIPTION OF EMBODIMENTS

Hereinafter, embodiments of the present invention are described with reference to the drawing. The present invention is not limited to these embodiments, and these embodiments can be changed or modified without departing from the spirit and the range of the present invention.

FIG. 1 is a front view of an automobile window glass as an example of embodiments of the present invention. The automobile window glass 1 illustrated in FIG. 1 includes a glass substrate 2, a black ceramic layer 3 formed in a peripheral portion on a vehicle-interior side main surface of the glass substrate 2, and a water absorbing antifogging film 4 formed on the vehicle-interior side main surface (hereinafter may be referred to as "vehicle-interior side surface" in some cases) of the glass substrate 1, the water absorbing antifogging film 4 being located in an inner peripheral side relative to the peripheral portion.

By using the automobile window glass 1 of the present invention as an automobile windshield, and setting a visual field of the camera installed in the vehicle so as to be included in a portion where the water absorbing antifogging film 4 has been formed, it is possible to prevent a decrease in accuracy of an driving support system and automatic driving system using image information from the camera due to the occurrence of fogging on the windshield. As a result, the accuracy of the driving support system and automatic driving system is improved.

In the automobile window glass 1 of the present invention, there is a space of more than 1 mm and less than 30 mm between the black ceramic layer 3 formed in the peripheral portion on the vehicle-interior side main surface of the glass substrate 2, and the water absorbing antifogging film 4 formed on the vehicle-interior side main surface of glass substrate 1, the water absorbing antifogging film 4 being located in the inner peripheral side relative to the peripheral portion, so that the concern of peeling-off or deterioration of the water absorbing antifogging film 4 due to infrared ray absorption in the black ceramic layer 3 is resolved. On the other hand, since a space between the black ceramic layer 3 and the water absorbing antifogging film 4 is not excessively large, there is no concern that the fogging on a portion serving as the space therebetween occurs.

In the present invention, the term "peripheral portion" means a region having a certain width from an end portion of the glass substrate toward a central portion of the main surface. The term "end portion" means a ridge line formed by a contact of the main surface with an end surface. Further, in the present invention, the side from the end portion toward the central portion of the main surface when viewed along a main surface direction of the glass substrate 2 is referred to as an inner peripheral side.

In the automobile window glass 1 of the present invention, it is more preferable that a space of 3 mm or more and 20 mm or less exists between the black ceramic layer 3 and the water absorbing antifogging film 4.

In the automobile window glass 1 of the present invention, the water absorbing antifogging film 4 may be formed on substantially the whole of the vehicle-interior side main surface of the glass substrate 2 as long as the space described above exists between the black ceramic layer 3 and the water absorbing antifogging film 4. However, it should be noted that when the water absorbing antifogging film 4 is formed on substantially the whole of the vehicle-interior side main surface of the glass substrate 2 as described above, the regulations of transmittance of an automobile windshield in each country may not be satisfied in some cases.

The function of the water absorbing antifogging film 4 in the automobile window glass 1 of the present invention is to prevent the decrease in accuracy of the driving support system and automatic driving system using image information from the camera installed in the vehicle due to the occurrence of the fogging on the automobile windshield, and when the visual field of the camera installed in the vehicle is located within the portion where the water absorbing antifogging film has been formed, the function of the water absorbing antifogging film 4 in the automobile window glass 1 of the present invention is exerted.

Further, as long as the visual field of the camera installed in the vehicle is located within the portion where the water absorbing antifogging film 4 has been formed, the less the portion where the water absorbing antifogging film 4 has been formed occupying the vehicle-interior side main surface of the glass substrate 2 is, the more the cost and labor required for forming the water absorbing antifogging film 4 are reduced, so that it is preferable.

The visual field of the camera installed in the vehicle is generally located in the "test area A" and the "test area B" specified in the annex "test area of safety glass used on a front side" of JIS R3212-1992 "test methods of safety glazing materials for road vehicles", and thus, the visual field of the camera is outside the visual field of the driver. Therefore, due to the formation of the water absorbing antifogging film, there is no concern that the problems such as a decrease in design property, a decrease in visibility of the vehicle exterior and fatigue of eyes may occur.

In the automobile window glass of the present invention, the black ceramic layer 3 is formed in the peripheral portion of the vehicle-interior side main surface of the glass substrate 2 for the purpose of providing hiding properties and decorativeness to the automobile window glass.

Example of the black ceramic layer 3 includes a black ceramic layer formed in a frame shape in the peripheral portion in order to hide the adhered portion in the case where the automobile window glass of the present invention is adhered and fixed to a body flange protruding inward from a substantially rectangular opening portion of an automobile body.

In the automobile window glass 1 illustrated in FIG. 1, the black ceramic layer 3 is formed in a substantially frame shape over the whole of the peripheral portion on the vehicle-interior side main surface of the glass substrate 2 for the purpose of hiding an attachment portion to a vehicle opening flange. The width of the black ceramic layer 3 having a substantially frame shape is, for example, wider on a lower side as compared to the other three sides in order to hide a wiper storage portion. Further, in a substantially central portion on an upper side, a wide portion exists for the purpose of hiding the existence of an interior mirror or various sensors.

In the automobile window glass 1 of the present invention, the width of the black ceramic layer 3 having a substantially frame shape is not particularly limited as long as it is a width by which the attachment portion to the vehicle opening flange is hidden, and is preferably 10 mm to 300 mm and more preferably 30 mm to 200 mm, on the central portion of the upper side, and on the lower side. The width of the black ceramic layer 3 in other portions is preferably 10 mm to 100 mm, and more preferably 20 mm to 50 mm. The black ceramic layer 3 improves the design property of the automobile window glass 1 of the present invention, and the width thereof can be changed depending on the size or shape of the automobile window glass 1.

As a method of forming the black ceramic layer on the glass substrate, conventionally known methods can be applied. Specifically, powders of heat-resistant black pigment such as metal oxide as an inorganic component, powders of low-melting-point glass frit, and optional components added as necessary are added to a resin and a solvent, followed by kneading to prepare a black ceramic paste. Next, the obtained black ceramic paste is applied to a predetermined position and region on at least one main surface of the glass substrate by screen printing or the like, followed by drying as necessary, and then, heating and baking are performed to form the black ceramic layer.

Generally, as black pigment, the low-melting-point glass, the resin, the solvent, and other optional components used for preparing the black ceramic paste, the same or similar materials for the black ceramic paste used for forming the black ceramic layer on the glass substrate can be used without particular limitation. As the black ceramic paste, commercially available products can be used. Examples of the commercially available products include, for example, black ceramic paste N9-104 (product name, manufactured by Fellow Co., Ltd.), and black ceramic paste AP51330 (product name, manufactured by Asahi Glass Co., Ltd.), and the like.

The conditions for heating and baking after applying to the glass substrate are not particularly limited as long as the conditions are set such that a black ceramic paste coating film is degreased and baked to form the black ceramic layer. For example, for the black ceramic paste N9-104 (product name, manufactured by Fellow Co., Ltd.) and black ceramic paste AP51330 (product name, manufactured by Asahi Glass Co., Ltd.), example thereof includes a baking treatment at 600° C. to 750° C. for 3 to 15 minutes.

Further, in the forming of the glass substrate used in the present invention, for example, in the case of having a heating and bending step for forming it for the automobile windshield, the black ceramic paste may be applied before the heating and bending step, and the black ceramic paste coating film may be degreased and baked simultaneously with the above heating and bending step to form the black ceramic layer.

The "black" of the black ceramic layer may be adjusted so as not to allow visible lights to transmit therethrough to such a degree that at least a portion needed to be hided can be hided. From this viewpoint, examples of the black pigment to be used also include a combination of pigments which become black by combining a plurality of colored pigments.

Further, from the same viewpoint, the black ceramic layer may be constituted as a sequential integrated film in its entire layer, or may be constituted with a dot pattern which is an aggregate of minute dots or the like.

The shape of the dots is not limited to a circle, and can also be an ellipse, a rectangle, a polygon, a star or the like. Further, the dot pattern may also have a form in that dot portions are made transparent and the dot portions are hollowed out from the black ceramic layer. Moreover, the dots may be formed by varying a size thereof or an interval therebetween within a formation region of the black ceramic layer. For example, when the black ceramic layer with the dot pattern is formed in a peripheral portion of the automobile window glass, an area ratio of transparent portion can be increased as approaching the inner peripheral side of the automobile window glass by decreasing the dot size or increasing the interval between dots as approaching the inner peripheral side. The black ceramic layer may have various patterns such as a striped pattern with parallel lines, a corrugated pattern, a bull's eye pattern, a lattice pattern, a checkered pattern, an annulus pattern, or the like.

The thickness of the black ceramic layer is not particularly limited as long as the thickness falls within a range where there is no problem in the visibility or the like. The black ceramic layer is preferably formed to have a thickness of about 8 μm to 20 μm, more preferably 10 μm to 15 μm.

The material of the glass substrate used for the automobile window glass of the present invention is not particularly limited as long as it is suitable for use as the automobile windshield, and examples thereof include commonly used soda lime glass, borosilicate glass, alkali-free glass, quartz glass, and the like. A glass substrate which absorbs ultraviolet ray or infrared ray may also be used as the glass substrate used for the automobile window glass of the present invention. Further, a laminated glass which includes a vehicle-interior side glass plate, a vehicle-exterior side glass plate, and an intermediate film disposed between these glass plates can also be used as the glass substrate. In this case, the water absorbing antifogging film is formed on the vehicle-interior side surface of the vehicle-interior side glass plate, while the black ceramic layer is formed on the vehicle-interior side surface of the vehicle-interior side glass plate, or on the vehicle-interior side surface of the vehicle-exterior side glass plate.

However, it is preferable to form the black ceramic layer on the vehicle-interior side main surface of the vehicle-interior side glass plate from the viewpoint of improving heat conduction efficiency.

The shape, size, and thickness of the glass substrate used in the automobile window glass of the present invention are not particularly limited as long as it is suitable for use as the automobile windshield. The shape of the glass substrate may be a flat plate, or may entirely or partially have a curvature. The thickness of the glass substrate may be, for example, about 0.5 mm to 10 mm.

The water absorbing antifogging film 4 used in the automobile window glass 1 of the present invention is not particularly limited as long as it is a substantially transparent film having a water absorbing property and antifogging property to prevent fogging by removing fine water droplets adhering to the main surface of the glass substrate 2. Specific examples of the water absorbing antifogging film include a water absorbing antifogging film having a water absorbing layer mainly containing a water absorbing crosslinked resin. The water absorbing antifogging film 4 may be constituted of only the water absorbing layer, and may further have, in addition to the water absorbing layer, various functional layers on the glass substrate 2 side or vehicle-interior side relative to the water absorbing layer. The water absorbing antifogging film 4 preferably includes a base layer having a lower water absorbing property than the water absorbing layer on the glass substrate 2 side relative to the water-absorbing layer. When the water absorbing antifogging film 4 includes a low water absorbing base layer, a difference in degree of expansion/contraction is small at an adhesion interface between the glass substrate 2 and the water absorbing antifogging film 4, actually between the glass substrate 2 and the base layer, and peeling-off resistance of the water absorbing antifogging film 4 can be improved.

The thickness of the water absorbing antifogging film 4 is preferably 50 μm or less, more preferably 10 μm or less, further preferably 5 μm or less, and is preferably 1 μm or more.

Hereinafter, a water absorbing material constituting the water absorbing layer having a water absorbing property shown above and the base material constituting the base layer are described.

(Water Absorbing Layer and Water Absorbing Material)

The water absorbing layer of the water absorbing antifogging film 4 according to the present invention is constituted of the water absorbing material mainly containing the water absorbing crosslinked resin. The water absorbing material may be constituted of only the crosslinked resin as long as it is a material having a high water absorbing property to such a degree that an antifogging property is obtained, and may contain a solid component other than the crosslinked resin. The crosslinked resin may be a crosslinked resin obtained by a reaction of a crosslinking component with a curing agent, or may be a crosslinked resin obtained by a reaction of a composition containing a reactive component with the crosslinking component and the curing agent. When the water absorbing antifogging film includes the base layer, hereinafter, the crosslinked resin constituting the water absorbing layer is referred to as a first crosslinked resin, and the crosslinked resin constituting the base layer is referred to as a second crosslinked resin in order to distinguish the crosslinked resin constituting the water absorbing layer from the crosslinked resin constituting the base layer.

In this description, the crosslinked resin refers to a crosslinked resin obtained from a composition containing the crosslinking component and the curing agent as main raw material components at a maximum ratio in all the reactive components. In this description, catalysts in the crosslinking component are classified as the curing agent as the reactive component. Further, when the reactive component is a component, such as a tetrafunctional hydrolyzable silicon compound, whose chemical composition obtained after the reaction is largely different from the raw material, a blended amount thereof in the composition is calculated based on, for example, oxide conversion in the case of a tetrafunctional hydrolyzable silicon compound, in consideration of a chemical structure obtained after the reaction.

Examples of the first crosslinked resin include a first cured epoxy resin, a first urethane resin, and a first crosslinked acrylic resin. One kind of these may be used alone, or two or more kinds thereof may be used in combination. In the following description, when referring to the crosslinking component and the curing agent in the first crosslinked resin, they are all referred to as "first . . . ".

The first cured epoxy resin is obtained by the reaction of the composition containing a first polyepoxide component and the first curing agent. The first urethane resin is obtained by the reaction of the composition containing a first polyisocyanate and a first polyol. The first crosslinked acrylic resin is obtained by the reaction of a composition containing a first crosslinking (meth) acrylic polymer and a first acrylic resin curing agent.

In this description, polyepoxide refers to a compound having two or more epoxy groups in one molecule. Examples of polyepoxide include a low-molecular compound thereof, an oligomer thereof, and a polymer thereof. The polyepoxide component is a component constituted of at least one kind of polyepoxide, and may be referred to as a main agent below, if necessary.

The curing agent is a compound having two or more reactive groups which reacts with an epoxy group of the polyepoxide in one molecule, and is a reaction catalyst such as a polyaddition type curing agent which is a type polyadded to polyepoxide by reaction, a condensation type curing agent which is a type polycondensed with a polyepoxide by reaction, and a Lewis acid, and is used as a term including a catalyst type curing agent which catalyzes polymerization reaction of polyepoxides. Examples of the catalyst type curing agent include a thermosetting agent and a photocuring agent, which are collectively referred to as the catalyst type curing agent.

Further, the cured epoxy resin refers to a cured product obtained by a crosslinking reaction of the above main agent and the curing agent, and/or a cured product obtained by a polymerization reaction of polyepoxides. The cured epoxy resin has a three-dimensional structure in which polyepoxides have been cross-linked by the polyaddition type curing agent or the like, and/or a structure in which polyepoxides have been polymerized linearly or three-dimensionally.

In this description, polyisocyanate refers to a compound having two or more isocyanate groups in one molecule. Examples of polyisocyanate include a low-molecular compound thereof, an oligomer thereof, and a polymer thereof. Further, the polyol refers to a high-molecular compound having approximately molecular weight of 200 or more and having two or more active hydrogen groups such as alcoholic hydroxyl groups in one molecule. The urethane resin refers to a cured product obtained by a crosslinking reaction of the above polyisocyanate and polyol. The urethane resin has a three-dimensional structure in which the polyol has been cross-linked with the polyisocyanate.

In this description, the crosslinking (meth) acrylic polymer is a (co) polymer obtained by (co) polymerizing a (meth) acrylic acid compound(s) selected from acrylic acid, methacrylic acid, esters thereof and the like, and is a compound having two or more crosslinking groups in one molecule. The crosslinking (meth) acrylic polymer may contain a polymerization unit derived from a monomer other than the (meth) acrylic acid compound of less than 100 mol % based on all the polymerization units. The acrylic resin curing agent refers to a compound having two or more functional groups reactive with the crosslinking group of the crosslinking (meth) acrylic polymer in one molecule. The crosslinked acrylic resin refers to a cured product obtained by a crosslinking reaction of the above crosslinking (meth) acrylic polymer and the acrylic resin curing agent. Here, the "polymerization unit" refers to a minimum repeating unit formed by a polymerization reaction of a monomer which is a compound having a polymerizable reactive group.

In addition, the term "crosslinked acrylic resin" also contains a substance in which the above crosslinking (meth) acrylic polymer and a reactive component other than the acrylic resin curing agent are partially bonded to a crosslinked structure formed of the crosslinking (meth) acrylic polymer and the acrylic resin curing agent to form a cured product. The crosslinked acrylic resin has a three-dimensional structure in which the crosslinking (meth) acrylic polymer has been crosslinked by the acrylic resin curing agent.

In this description, "(meth) acryl . . . " is a general term for "methacryl . . . " and "acryl . . . ". The same applies to (meth) acryloyl . . . .

The first cured epoxy resin having the above water absorbing property used in the present invention is preferably a resin obtained by a reaction of water absorbing layer forming composition containing the first polyepoxide component, the first polyaddition type curing agent, and the first catalyst type curing agent, which are described below.

As the polyepoxide constituting the first polyepoxide component, a glycidyl ether polyepoxide, a glycidyl ester polyepoxide, a glycidylamine polyepoxide, a cyclic aliphatic polyepoxide or the like, which are used as raw material component of a commonly used cured epoxy resin, can be used after adjusting the molecular weight thereof so as to fall within the following range. The number of epoxy groups per molecule of the polyepoxide in the first polyepoxide component is not particularly limited as long as it is 2 or more on average, but is preferably 2 to 10, more preferably 2 to 7, and particularly preferably 3 to 5.

The molecular weight of the polyepoxide constituting the first polyepoxide component is preferably 100 to 3000, more preferably 300 to 2000, and particularly preferably 400 to 1800 from the viewpoints of durability, heat curability of the coating film, handleability during preparing coating liquid, or the like. Further, an epoxy equivalent of the polyepoxide (the number of grams [g/eq] of a resin containing epoxy groups equivalent to 1 gram) is preferably 120 g/eq to 200 g/eq, and more preferably 150 g/eq to 180 g/eq.

The molecular weight in this description refers to mass average molecular weight (Mw) unless otherwise particularly stated. Further, the mass average molecular weight (Mw) in this description refers to mass average molecular weight with reference to polystyrene measured by Gel Permeation Chromatography (GPC).

As the first polyepoxide component, one kind of the above polyepoxide may be used alone, or two or more kinds thereof may be used in combination.

As described above, the first polyepoxide component used in the first cured epoxy resin which is the main component of the water absorbing layer in the present invention is preferably a polyepoxide having no aromatic ring from the viewpoint of obtaining high water absorbing property. Similarly, the polyaddition type curing agent which is one of the reactive raw materials of the first cured epoxy resin is also preferably compound having no aromatic ring from the viewpoint of obtaining high water absorbing property.

That is, there is a concern that even if the above first polyepoxide component is constituted of an aliphatic polyepoxide, when the first polyaddition type curing agent to be used has an aromatic ring, the cured epoxy resin obtained by a reaction of these may be a cured epoxy resin having a relatively large number of aromatic rings, resulting in insufficient water absorbing property.

Accordingly, the first polyaddition type curing agent is preferably a polyamine or polycarboxylic anhydride, each having no aromatic ring, and particularly preferable a polyamine having no aromatic ring. As the polyamines, polyamines having 2 to 4 amino groups having active hydrogen are preferred, and as the polycarboxylic anhydride, a dicarboxylic anhydride, a tricarboxylic anhydride, and a tetracarboxylic anhydride are preferred.

In the present invention, when an amino compound having the active hydrogen is used as the first polyaddition type curing agent, it is preferable to use it so that the equivalent ratio of amine active hydrogen to the epoxy group derived from the first polyepoxide component is 0.6 to 0.8. Similarly to the above, when the equivalent ratio of the amine active hydrogen to the epoxy group falls within the above range, a cured epoxy resin having a three-dimensional network structure appropriately crosslinked so as to have the above water absorbing property can be obtained without significant yellowing.

When the above first polyepoxide component and the first polyaddition type curing agent are used in combination for obtaining the first cured epoxy resin used in the present invention, in addition to these, the first catalyst type curing agent is preferably used together. This is because by using the first catalyst type curing agent, it is possible to obtain an effect of accelerating the speed of crosslinking by a polyaddition reaction of the first polyepoxide component and the first polyaddition type curing agent, or an effect of reducing a defect generated at a crosslinking site formed by the first polyepoxide component and the first polyaddition type curing agent. Examples of the defect in the crosslinking site include color development of a cured epoxy resin due to alteration of the crosslinking site due to a thermal load.

When the first catalyst type curing agent is used in addition to the first polyaddition type curing agent, the first catalyst type curing agent is used in an amount of preferably 1 mass % to 20 mass %, more preferably 1 mass % to 10 mass %, and particularly preferably 1 mass % to 5 mass % based on 100 mass % of the first polyepoxide component. When the use amount of the first catalyst type curing agent based on 100 mass % of the first polyepoxide component is 1 mass % or more, the reaction proceeds sufficiently, and sufficient water absorbing property and durability can be realized in the obtained first cured epoxy resin. When the use amount of the first catalyst type curing agent based on 100 mass % of the first polyepoxide component is 20 mass % or less, it is easy to prevent occurrence of appearance problems such that the cured epoxy resin turns yellow since a residue of the first catalyst type curing agent exists in the obtained first cured epoxy resin.

In the case where the first catalyst type curing agent is used in addition to the first polyaddition type curing agent, regarding the use ratio of the first polyaddition type curing agent to the first polyepoxide component, when the first catalyst type curing agent is used so as to satisfy the above ratio, the equivalent ratio of the reactive group of the first polyaddition type curing agent to the epoxy group may be reduced by about 10% to 50% from the above 0.5 to 1.0.

The first urethane resin used in the present invention is a crosslinked resin obtained by the reaction of the water absorbing layer forming composition containing the first polyisocyanate and the first polyol, and is a crosslinked resin having a high water absorbing property to such a degree that the antifogging property can be obtained when used as the water absorbing material mainly containing it.

Specific examples of the first urethane resin having such a high water absorbing property include urethane resin obtained by a reaction of a first polyol which contains a (meth) acrylic polyol having an average molecular weight of 1000 to 4000 and a polyoxyalkylene polyol having an average molecular weight of 400 to 5000, with a first polyisocyanate.

It is considered that by using a combination of a (meth) acrylic polyol having an average molecular weight of 1000 to 4000 and a polyoxyalkylene polyol having an average molecular weight of 400 to 5000 as the first polyol for producing the first urethane resin, chains in the first urethane resin contribute to the increase of the desorption speed of water absorbed in the water absorbing layer.

The above polyoxyalkylene polyol is used as a first polyol for exerting an antifogging function on the water absorbing layer. For the polyoxyalkylene polyol, a polyol having an oxyethylene chain, an oxypropylene chain or the like can be used. In particular, since the oxyethylene chain is excellent in a function of absorbing water as a binding water, it is advantageous in forming a water absorbing layer having a reversible absorption and desorption with fast desorption rate during desorption. Therefore, it is preferable to use a polyol having the oxyethylene chain in consideration of antifogging property in a low-temperature environment such as winter in which the ambient temperature is 5° C. or less.

The average molecular weight of the above polyoxyalkylene polyol is 400 to 5000, and when the average molecular weight is less than 400, the ability to absorb water as the binding water is low, and when the average molecular weight is more than 5000, a defect such as curing failure or a decrease in film strength is likely to occur. Considering the water absorbing property or mechanical strength of the water absorbing layer, the average molecular weight is more preferably 400 to 4500. In this description, the average molecular weight of the material used for the urethane resin and the obtained urethane resin refers to number average molecular weight (Mn). The number average molecular weight (Mn) refers to number average molecular weight with reference to polystyrene measured by the Gel Permeation Chromatography (GPC).

In particular, when the above polyoxyalkylene polyol is polyethylene glycol, the average molecular weight is preferably 400 to 2000 in consideration of the ability to absorb water, the curing failure, or the mechanical strength of the water absorbing layer. In the case of oxyethylene/oxypropylene copolymer polyol, the average molecular weight is preferably 1500 to 5000.

The hydroxyl value of the polyoxyalkylene polyol used as the first polyol is preferably 80 mgKOH/g to 600 mgKOH/g, and more preferably 100 mgKOH/g to 200 mgKOH/g. One kind of the polyoxyalkylene polyol may be used alone, or two or more kinds thereof may be used in combination.

The above (meth) acrylic polyol exerts an effect of lowering mainly abrasion resistance, water resistance, and surface friction coefficient in the water absorbing layer, that is, slipping property on the surface of the water absorbing layer. In addition to this, the (meth) acrylic polyol has an action of shortening a leveling step of uniformizing a film thickness deviation when the water absorbing layer forming composition for forming a water absorbing layer is applied to a substrate.

The (meth) acrylic polyol has an average molecular weight of 1000 to 4000. When it is less than 1000, the abrasion resistance of the water absorbing layer tends to be decreased, and when it is more than 4000, the coating property of the water absorbing layer forming composition during formation of the water absorbing layer is deteriorated, and the formation of the water absorbing layer tends to be difficult. In consideration of compactness and hardness of the obtained water absorbing layer, the number of hydroxyl groups of the (meth) acrylic polyol is preferably 3 or 4. The hydroxyl value of the (meth) acrylic polyol is preferably 10 mgKOH/g to 300 mgKOH/g, and more preferably 30 mgKOH/g to 160 mgKOH/g.

As the first polyisocyanate for forming the first urethane resin through a crosslinking reaction with the above first polyol, an organic polyisocyanate such as an organic diisocyanate, preferably a trifunctional polyisocyanate having a biuret and/or isocyanurate structure using hexamethylene diisocyanate as a starting material can be used.

Such a first polyisocyanate has weather resistance, chemical resistance, and heat resistance, and is particularly effective for the weather resistance. In addition to those described above, diisophorone diisocyanate, diphenylmethane diisocyanate, bis (methylcyclohexyl) diisocyanate, toluene diisocyanate, and the like can also be used as the first polyisocyanate.

The NCO %, which represents mass % of the isocyanate group (NCO group) based on the total mass of the first polyisocyanate, is preferably 18% to 30%, more preferably 20% to 25%.

The ratio of the above polyoxyalkylene polyol and the above (meth) acrylic polyol is adjusted such that the obtained first urethane resin has the above saturated water absorption amount as the water absorbing property. For example, in the case of the polyethylene glycol and (meth) acrylic polyol, it is preferably set to the component ratio of polyethylene glycol:(meth) acrylic polyol=50:50 to 70:30 in mass ratio.

The first crosslinked acrylic resin used in the present invention is a crosslinked resin obtained by a reaction of the water absorbing layer forming composition containing the first crosslinking (meth) acrylic polymer and the first acrylic resin curing agent, and is a crosslinked resin having a high water absorbing property to such a degree that the antifogging property can be obtained when used as the water absorbing material mainly containing it.

The first crosslinking (meth) acrylic polymer is preferably a linear polymer. The molecular weight of the first crosslinking (meth) acrylic polymer is preferably 500 to 50000, and particularly preferably 2000 to 20000 in number average molecular weight. When the molecular weight is less than 500, there is a concern that the antifogging property of the water absorbing layer may decrease. When the molecular weight is more than 50000, there is a concern that the adhesiveness between the base layer and the water absorbing layer may decrease.

The crosslinking group of the first crosslinking (meth) acrylic polymer is not particularly limited as long as it is a group capable of reacting with the reactive group of the first acrylic resin curing agent to form a three-dimensional network structure. Specific examples of the crosslinking group include a vinyl group, an epoxy group, a styryl group, a (meth) acryloyloxy group, an amino group, a ureido group, a chloro group, a thiol group, a sulfide group, a hydroxyl group, a carboxy group, an acid anhydride group, and the like, and preferable examples thereof include a carboxy group, an epoxy group, or a hydroxyl group, and a carboxy group is particularly preferred. The number of crosslinking groups of the first crosslinking (meth) acrylic polymer may be any number as long as the antifogging property and durability required in the present invention are satisfied, and generally, it is preferably 1.0 millimole to 3.0 millimole, and more preferably 1.5 millimole to 2.5 millimole per 1 g of the first crosslinking (meth) acrylic polymer.

It is preferable that the first crosslinking (meth) acrylic polymer has a hydrophilic group or a hydrophilic polymer chain from the standpoint of obtaining a crosslinked resin having a high water absorbing property. Alternatively, by allowing the first acrylic resin curing agent to have a hydrophilic group or a hydrophilic polymer chain, water absorbing property may be provided to the obtained first crosslinked acrylic resin. The first crosslinking (meth) acrylic polymer is preferably a crosslinking (meth) acrylic polymer having a cationic group and a crosslinking group. The cationic group is preferably a group having a quaternary ammonium structure. The ratio of the cationic group in the crosslinking (meth) acrylic polymer is 0.1 millimole to 2.0 millimole, preferably 0.4 millimole to 2.0 millimole, and more preferably 0.5 millimole to 1.5 millimole per 1 g of the polymer.

Introduction of the crosslinking group or the cationic group into the first crosslinking (meth) acrylic polymer may be performed on a polymer after polymerization, or the first crosslinking (meth) acrylic polymer having the above crosslinking group or the cationic group may be obtained by using a monomer having the crosslinking group or a monomer having the cationic group and copolymerizing a raw material monomer containing these. Generally, the first crosslinking (meth) acrylic polymer is produced by the latter method.

In the first crosslinked acrylic resin used in the present invention, the first acrylic resin curing agent to be combined with the above first crosslinking (meth) acrylic polymer is not particularly limited as long as it is an acrylic resin curing agent having a reactive group reactive with the crosslinking group of the first crosslinking (meth) acrylic polymer.

The crosslinking component and the curing agent, which are the main raw material components of the above first crosslinked resin contained in the water absorbing layer forming composition, are as described above, including the preferred embodiments such as a compound to be used and a ratio for combination. The water absorbing layer forming composition generally contains a solvent in addition to the crosslinking component and the curing agent which are the main raw material components of the above first crosslinked resin. If necessary, in addition to these, a reactive additive such as a coupling agent, and a non-reactive additive such as a filler, an antioxidant, an ultraviolet ray absorber, an infrared ray absorber, and a light stabilizer may be contained.

Examples of the reactive additive among the additives optionally contained in the water absorbing layer forming composition include a coupling agent having functional groups having reactivity with a reactive group possessed by the component in the crosslinking component which is a main raw material component of the first crosslinked resin or a component of the curing agent other than the catalyst type curing agent, specifically, the crosslinking group of the crosslinking component or a reactive group of the curing agent reactive with the crosslinking group, and the like. The coupling agent in the water absorbing layer forming composition is a component blended for the purpose of improving adhesiveness between the water absorbing layer and the base layer, or adhesiveness between the water absorbing layer and a functional layer when the functional layer is laminated as necessary on the water absorbing layer, and is one of the components which is preferably blended.

The coupling agent used is preferably an organic metal coupling agent or a polyfunctional organic compound. Examples of the organic metal coupling agent include a silane-based coupling agent (hereinafter, referred to as a silane coupling agent), a titanium-based coupling agent, an aluminum-based coupling agent, and a zirconium-based coupling agent. One or more kinds selected from the silane coupling agent, the titanium-based coupling agent, and the zirconium-based coupling agent are preferable, and the silane coupling agent is particularly preferable.

Here, when the above first crosslinked resin is the first urethane resin, a silane coupling agent having a functional group reactive with a reactive group of the first polyisocyanate and/or the first polyol, and a hydrolyzable group is preferably used as the silane coupling agent.

When the above first crosslinked resin is the first crosslinked acrylic resin, a silane coupling agent having a functional group reactive with a reactive group of the first crosslinking (meth) acrylic polymer and/or the first acrylic resin curing agent and a hydrolyzable group is preferably used as the silane coupling agent.

When the above first crosslinked resin is the first urethane resin or the first crosslinked acrylic resin, as for the blended amount of the silane coupling agent in the water absorbing layer forming composition, mass ratio of the silane coupling agent is preferably 5 mass % to 40 mass % and more preferably 10 mass % to 30 mass % based on 100 mass % of the total mass of the resin component of the first crosslinked resin. When the first crosslinked resin is the first cured epoxy resin, the mass ratio of the silane coupling agent in the water absorbing layer forming composition is preferably in the same as that of the first urethane resin.

The water absorbing layer forming composition preferably further contains a filler as an optional component. By containing the filler, the mechanical strength and heat resistance of the formed water absorbing layer can be enhanced, and the cure shrinkage of the resin during the curing reaction can be reduced. Such a filler is preferably a filler constituted of a metal oxide. Examples of the metal oxide include silica, alumina, titania, and zirconia, among which silica is preferred.

As the above metal oxide fine particles, ITO (Indium Tin Oxide) fine particles can also be used. Since ITO has infrared ray absorbing property, heat ray absorbing property can be provided to the water absorbing crosslinked resin. Thus, when the ITO fine particles are used, an antifogging effect due to heat ray absorption can be expected in addition to the water absorbing property.

The fillers contained in the water absorbing layer forming composition are preferably in the form of particles. The average primary particle diameter thereof is preferably 300 nm or less, more preferably 100 nm or less, and particularly preferably 50 nm or less. When the average primary particle diameter is 300 nm or less, the aggregation tendency of the particles in the composition containing those is not increased, and sedimentation of the particles can be avoided. In addition, when the water absorbing layer is formed by the composition containing those, the occurrence of the fogging (haze value, haze) due to scattering can be prevented, and it is preferable to set the above particle diameter from the standpoint of maintaining transparency. The lower limit of the average primary particle diameter is not particularly limited, and particles of about 2 nm that can be produced according to the current technology can also be used. The average primary particle diameter of the particles is obtained according to TEM.

The blended amount of the filler is preferably 0.5 mass % to 5 mass %, and more preferably 1 mass % to 3 mass % based on 100 mass % of the total mass of the crosslinking component and the curing agent which are the main raw material components of the first crosslinked resin. Hereinafter, the crosslinking component and the curing agent which are the main raw material components of the first crosslinked resin may be collectively referred to as a "resin component".

When the blended amount of the filler based on 100 mass % of the total mass of the resin component is 0.5 mass % or more, it is easy to prevent a decrease in the effect of reducing the cure shrinkage of the water absorbing material mainly containing the first crosslinked resin. Further, when the blended amount of the filler based on 100 mass % of the total mass of the resin component is 5 mass % or less, a space for water absorbing can be ensured sufficiently, and the antifogging property is easily enhanced.

The water absorbing layer forming composition preferably contains the antioxidant as an optional component in order to enhance the weather resistance of the obtained water absorbing layer. When the first crosslinked resin mainly constituting the water absorbing layer is exposed to heat or light to be oxidized and altered, stress accumulation easily occurs in the water absorbing layer, and then, the antifogging film is easily peeled off. Such a phenomenon can be avoided by adding the antioxidant.

Examples of the antioxidant include a phenol-based antioxidant which prevents oxidation of a resin by capturing and decomposing peroxy radicals, and a phosphorus-based antioxidant and sulfur-based antioxidant which prevents oxidation of resin by decomposing a peroxide, and the like, and in the present invention, the phenol-based antioxidant is preferably used.

The amount of the antioxidant to be blended in the water absorbing layer forming composition is preferably 0.5 mass % to 2 mass %, and more preferably 1 mass % to 2 mass % based on 100 mass % of the total mass of the crosslinking component and the curing agent which are the main raw material components of the first crosslinked resin.

The water absorbing layer forming composition preferably contains the ultraviolet ray absorber as an optional component in order to enhance the weather resistance of the obtained water absorbing layer, particularly the resistance to ultraviolet ray. Examples of the ultraviolet ray absorber include conventionally known ultraviolet ray absorbers, specifically, benzophenone-based compounds, triazine-based compounds, benzotriazole-based compounds, and the like.

Many of these exemplified ultraviolet ray absorbers have an absorbing ability in a range of approximately 325 nm to 390 nm. Such the ultraviolet ray absorber having an absorbing ability of ultraviolet ray having a relatively long wavelength is preferably used from its property.

In the present invention, one kind of these ultraviolet ray absorbers may be used alone, or two or more kinds thereof may be used in combination. In addition, in the water absorbing layer forming composition used in the present invention, among these ultraviolet ray absorbers, a hydroxyl group-containing benzophenone ultraviolet ray absorber as exemplified above is preferably used because solubility in a solvent and an absorption wavelength band are desirable.

In the automobile window glass of the present invention, a water absorbing layer may be formed on a resin film by using the above water absorbing layer forming composition, and the resin film having the water absorbing layer formed thereon may be fixed to the vehicle-interior side surface of the glass substrate by an adhesive to form a water absorbing antifogging film.

As the resin film to be used for this purpose, polyethylene terephthalate, polyethylene, polystyrene, polypropylene, nylon, polycarbonate, polyvinyl chloride, cellulose triacetate, cellophane, polyurethane, and the like are preferable in terms of excellent transparency when fixed to the vehicle-interior side surface of the glass substrate.

The thickness of the resin film is preferably 10 µm to 70 µm, since it is easy to handle whenever the water absorbing layer is formed on the resin film, or the resin film is fixed to the vehicle-interior side surface of the glass substrate, and further, even if it is fixed to the vehicle-interior side surface of the glass substrate, the resin film does not undergo large deformation. The thickness of the water absorbing layer formed on the resin film is preferably 1 µm to 100 µm since sufficient water absorbing ability can be obtained. The thickness of the adhesive is preferably 5 µm to 50 µm since sufficient adhesive strength is obtained, and distortion of a visual field does not occur when the resin film is fixed to the vehicle-interior side surface of the glass substrate.

When the resin film is fixed to the vehicle-interior side surface of the glass substrate, the adhesive is applied to the resin film on which the water absorbing layer has been formed, on the surface opposite to the surface on which the water absorbing layer has been formed, followed by bonding to the vehicle-interior side surface of the sufficiently cleaned glass substrate and drying. When the vehicle-interior side surface of the glass substrate has double curvature, the resin film is heated to 350° C. to 600° C. by a heat gun or the like, and the resin film is formed into a shape following the curved surface of the vehicle-interior side surface of the glass substrate, whereby the resin film can be bonded to the vehicle-interior side surface of the glass substrate.

The adhesive is preferably acrylic-based adhesive, silicone-based adhesive, epoxy resin-based adhesive, urethane-based adhesive, chloroprene-based adhesive, EVA-based adhesive, rubber-based adhesive, or the like from the standpoint of being able to sufficiently and firmly bond the vehicle-interior side surface of the glass substrate to the resin film.

EXAMPLES

A black ceramic layer was formed in a peripheral portion of one main surface of a clean glass substrate (100 mm×100 mm×2 mm) having surfaces polished and cleaned with a cerium oxide and dried, and a water absorbing antifogging film having a thickness of 5 µm or 10 µm was formed with a space of 1 mm to 30 mm provided against the black ceramic layer to obtain a sample for evaluation. For the obtained sample, evaluations were performed on the presence or absence of the occurrence of fogging, and the presence or absence of color tone change as an indicator of the presence or absence of deterioration of the water absorbing antifogging film, by the following steps.

Criteria for determining fogging: When steam of about 80° C. to 100° C. emitted from a steam iron (Iris Ohyama Inc., product number SIR-02CL) was applied to the water absorbing antifogging film from a distance of about 150 mm away from the sample, the case where no fogging was observed was evaluated as "○", and the case where fogging was observed was evaluated as "x".

Criteria for determining color tone change: The opposite surface of a surface on which the black ceramic layer was formed was irradiated with light beam from an infrared lamp (Dainichi Bulb Co., Ltd., product number R100 E26) for about 1 hour from a distance of 35 mm, and thereafter, when the appearance of the surface was checked, the case where no color tone change was observed was evaluated as "○", and the case where partial color tone change was observed was evaluated as "x". The results are presented in the following Table.

TABLE 1

| | Space | | | | | | | |
| --- | --- | --- | --- | --- | --- | --- | --- | --- |
| | 1 mm | 3 mm | 5 mm | 10 mm | 15 mm | 20 mm | 25 mm | 30 mm |
| Occurrence of fogging (thickness 5 µm) | ○ | ○ | ○ | ○ | ○ | ○ | x | x |
| Occurrence of fogging (thickness 10 µm) | ○ | ○ | ○ | ○ | ○ | ○ | ○ | x |
| Color change (thickness 5 µm) | x | ○ | ○ | ○ | ○ | ○ | ○ | ○ |
| Color change (thickness 10 µm) | x | x | ○ | ○ | ○ | ○ | ○ | ○ |

In the examples where the space between the black ceramic layer and the water absorbing antifogging film is more than 1 mm and less than 30 mm, no fogging occurred when the thickness of the water absorbing antifogging film was 10 μm. When the thickness of the water absorbing antifogging film was 5 μm, no change in color tone was observed. In the examples where the space between the black ceramic layer and the water absorbing antifogging film was 3 mm or more and 20 mm or less, no fogging occurred when the thickness of the antifogging film was either 5 μm or 10 μm, and no change in color tone was observed when the thickness of the antifogging film was 5 μm. In the example where the space between the black ceramic layer and the water absorbing antifogging film was 1 mm, change in color tone was observed when the thickness of the water absorbing antifogging film was either 5 μm or 10 μm. In the example where the space between the black ceramic layer and the water absorbing antifogging film was 30 mm, the fogging occurred when the thickness of the water absorbing antifogging film was either 5 μm or 10 μm.

Although the present invention has been described in detail with reference to particular embodiments, it will be apparent to those skilled in the art that various changes and modifications can be made without departing from the spirit and scope of the present invention. The present application is based on Japanese Patent Application No. 2016-083786 filed on Apr. 19, 2016, the contents of which are incorporated herein by reference.

DESCRIPTION OF THE REFERENCE NUMERALS

1 Automobile window glass
2 Glass substrate
3 Black ceramic layer
4 Water absorbing antifogging film

The invention claimed is:

1. An automobile window glass, comprising:
a glass substrate;
a black ceramic layer formed in a peripheral portion on a vehicle-interior side main surface of the glass substrate; and
a water absorbing antifogging film formed on the vehicle-interior side main surface of the glass substrate, the water absorbing antifogging film being located in an inner peripheral side relative to the peripheral portion,
wherein a space of more than 1 mm and less than 30 mm exists between the black ceramic layer and the water absorbing antifogging film on the vehicle-interior side main surface of the glass substrate.

2. The automobile window glass according to claim 1, wherein the glass substrate comprises a laminated glass comprising a vehicle-interior side glass plate, a vehicle-exterior side glass plate, and an intermediate film disposed between these glass plates, and the black ceramic layer and the water absorbing antifogging film are formed on a vehicle-interior side main surface of the vehicle-interior side glass plate.

3. The automobile window glass according to claim 1, wherein a space of 3 mm or more and 20 mm or less exists between the black ceramic layer and the water absorbing antifogging film.

4. The automobile window glass according to claim 1, wherein the water absorbing antifogging film has a thickness of 1 μm or more and 50 μm or less.

5. The automobile window glass according to claim 1, wherein the water absorbing antifogging film comprises a base layer on the glass substrate side.

6. The automobile window glass according to claim 2, wherein a space of 3 mm or more and 20 mm or less exists between the black ceramic layer and the water absorbing antifogging film.

7. The automobile window glass according to claim 2, wherein the water absorbing antifogging film has a thickness of 1 μm or more and 50 μm or less.

8. The automobile window glass according to claim 3, wherein the water absorbing antifogging film has a thickness of 1 μm or more and 50 μm or less.

9. The automobile window glass according to claim 6, wherein the water absorbing antifogging film has a thickness of 1 μm or more and 50 μm or less.

10. The automobile window glass according to claim 2, wherein the water absorbing antifogging film comprises a base layer on the glass substrate side.

11. The automobile window glass according to claim 3, wherein the water absorbing antifogging film comprises a base layer on the glass substrate side.

12. The automobile window glass according to claim 6, wherein the water absorbing antifogging film comprises a base layer on the glass substrate side.

13. The automobile window glass according to claim 4, wherein the water absorbing antifogging film comprises a base layer on the glass substrate side.

14. The automobile window glass according to claim 7, wherein the water absorbing antifogging film comprises a base layer on the glass substrate side.

15. The automobile window glass according to claim 8, wherein the water absorbing antifogging film comprises a base layer on the glass substrate side.

16. The automobile window glass according to claim 9, wherein the water absorbing antifogging film comprises a base layer on the glass substrate side.

17. The automobile window glass according to claim 1, wherein the glass substrate comprises a laminated glass comprising a vehicle-interior side glass plate, a vehicle-exterior side glass plate, and an intermediate film disposed between these glass plates, and the black ceramic layer is formed on a vehicle-interior side main surface of the vehicle-exterior side glass plate, and the water absorbing antifogging film is formed on a vehicle-interior side main surface of the vehicle-interior side glass plate.

18. The automobile window glass according to claim 17, wherein a space of 3 mm or more and 20 mm or less exists between the black ceramic layer and the water absorbing antifogging film.

19. The automobile window glass according to claim 17, wherein the water absorbing antifogging film has a thickness of 1 μm or more and 50 μm or less.

* * * * *